United States Patent
Hutchings et al.

(10) Patent No.: US 8,940,666 B2
(45) Date of Patent: Jan. 27, 2015

(54) FLUID COMPOSITION FOR WELLBORE AND PIPELINE CLEANOUT AND METHOD OF USE THEREOF

(75) Inventors: Nathan R. Hutchings, Shreveport, LA (US); Stewart A. Simpson, Jefferson, TX (US)

(73) Assignee: Bear Creek Services, LLC, Shreveport, LA (US)

( * ) Notice: Subject to any disclaimer, the term of this patent is extended or adjusted under 35 U.S.C. 154(b) by 236 days.

(21) Appl. No.: 13/604,719

(22) Filed: Sep. 6, 2012

(65) Prior Publication Data

US 2014/0060845 A1    Mar. 6, 2014

(51) Int. Cl.
*C09K 8/52*    (2006.01)

(52) U.S. Cl.
USPC .......................................... 507/219; 166/305.1

(58) Field of Classification Search
None
See application file for complete search history.

(56) References Cited

U.S. PATENT DOCUMENTS

| | | | |
|---|---|---|---|
| 3,493,000 A * | 2/1970 | Canevari et al. | 137/13 |
| 3,768,565 A * | 10/1973 | Persinski et al. | 166/308.2 |
| 7,781,380 B2 | 8/2010 | Lin et al. | |
| 7,897,547 B1 | 3/2011 | Lin et al. | |
| 7,950,459 B2 | 5/2011 | Sullivan et al. | |
| 2008/0064614 A1* | 3/2008 | Ahrenst et al. | 507/209 |
| 2010/0044040 A1* | 2/2010 | Parlar et al. | 166/276 |
| 2012/0175108 A1 | 7/2012 | Foubister et al. | |

* cited by examiner

*Primary Examiner* — Alicia Bland
(74) *Attorney, Agent, or Firm* — Richard A. Fagin

(57) ABSTRACT

A fluid composition for cleanout of wellbores and pipe systems includes an effective amount of an amphiphilic chemical combined with an effective amount of a friction reducer in an aqueous solution of a base liquid. A remainder of the composition includes the base liquid.

9 Claims, 1 Drawing Sheet

FLUID COMPOSITION FOR WELLBORE AND PIPELINE CLEANOUT AND METHOD OF USE THEREOF

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates generally to the field of fluids used in subsurface wellbore, or pipeline cleaning. More specifically, the disclosure relates to the use of amphiphilic blends and friction reducers to enhance removal of sand and cuttings from wellbores, particularly after multi-zone fracturing operations.

Wellbores drilled through subsurface formations include vertical and "horizontal" wells, i.e., those that are highly inclined from vertical up to and exceeding 90 degrees from vertical. The objective of drilling such wells is to penetrate a large area of a subsurface formation or formations that exist in layers having approximately the same orientation with respect to vertical, that is, the formations are highly inclined with respect to vertical.

Some such formations include naturally or mechanically fractured zones, that is, zones where the formation has enhanced hydraulic permeability and conductivity due to tectonic stresses. Some fractured zones contain hydrocarbons in the form of oil and/or gas. A horizontal wellbore with fractured formation enhances the hydraulic interconnection of a large surface area of the formation to a single conduit, thereby making it economically feasible to produce the hydrocarbons.

It is also known in the art to stimulate such wellbores through such formations, as well as non-horizontal wellbores, after completion of the wellbore by hydraulic fracturing. Hydraulic fracturing may further enable hydraulic connection of the formation located at a substantial lateral distance from the wellbore, thus enhancing the productivity of the wellbore further. Hydraulic fracturing includes pumping a liquid suspension of "proppant", which is a granular material whose grains are suitable to hold open a fracture created by the pressure of pumping the suspension into the formation after the pumping pressure is relieved.

Hydraulic fracturing may be performed in some wellbores in a plurality of individual zones isolated by seal elements disposed in the wellbore after the individual zone has been hydraulically fractured. It may be necessary to remove the mechanical obstructions, excess cuttings and other debris from the wellbore in order to gain access to the entire horizontal wellbore for fracturing. It may also be necessary to remove excess fracture proppant, other debris and to remove the seal elements from the wellbore after hydraulic fracturing operations are finished in order to produce hydrocarbons commercially from the wellbore. The removal of debris, seals, and excess proppant from horizontal wellbores is typically facilitated through the use of a coil-tubing rig or work-over rig equipped with a bottom-hole tool assembly designed for milling debris into small particles and/or flushing the obstructions up the wellbore annulus to the surface.

It is known in the art that fluid system additives can be used to enhance well-bore cleaning operations. Generally, friction reducers such as high molecular weight polymers of acrylates, acrylamides, and derivatives thereof can be added to the fluid system to reduce pressure pumping requirements and build viscosity in the fluid. Furthermore, sand and debris removal from horizontal wellbores may be performed with intermittently pumped high viscosity "pills" of gel disposed in a high viscosity, concentrated water solution. Typically, the gel is a xanthan, guar, polyacrylamide (or derivative thereof), cellulostic polymer (or derivative thereof), or other polymeric material, which may be the same as used to suspend the proppant in the hydraulic fracturing operation. It is believed that using the gel pill as described performs the function of a "liquid squeegee", that is, to sweep the sand and other debris out of the wellbore by the function of the high-viscosity of the gel pill. It is further believed that high viscosity solutions are necessary to keep solid particles/debris in suspension as they travel through the annulus so as to prevent sedimentation and accumulation of solids within the wellbore behind the bottom-hole tool assembly, thereby reducing the probably of the debris causing the tubing and tools to become stuck in the wellbore.

Although the existing art provides means to enable horizontal well completions operations, the frequency of operational failures due to solids accumulation and production-related failures to do the debris left in the annulus after clean-out procedures creates the need for sand and debris removal fluids having higher solids removal efficiency than those known in the art.

SUMMARY

One aspect is a fluid composition for cleanout of wellbores drilled through subsurface formations that includes an effective amount of an amphiphilic chemical combined with an effective amount of a friction reducer in an aqueous solution of a base liquid. A remainder of the composition includes the base liquid.

Other aspects and advantages of the invention will be apparent from the description and claims which follow.

DETAILED DESCRIPTION

Figure 1:
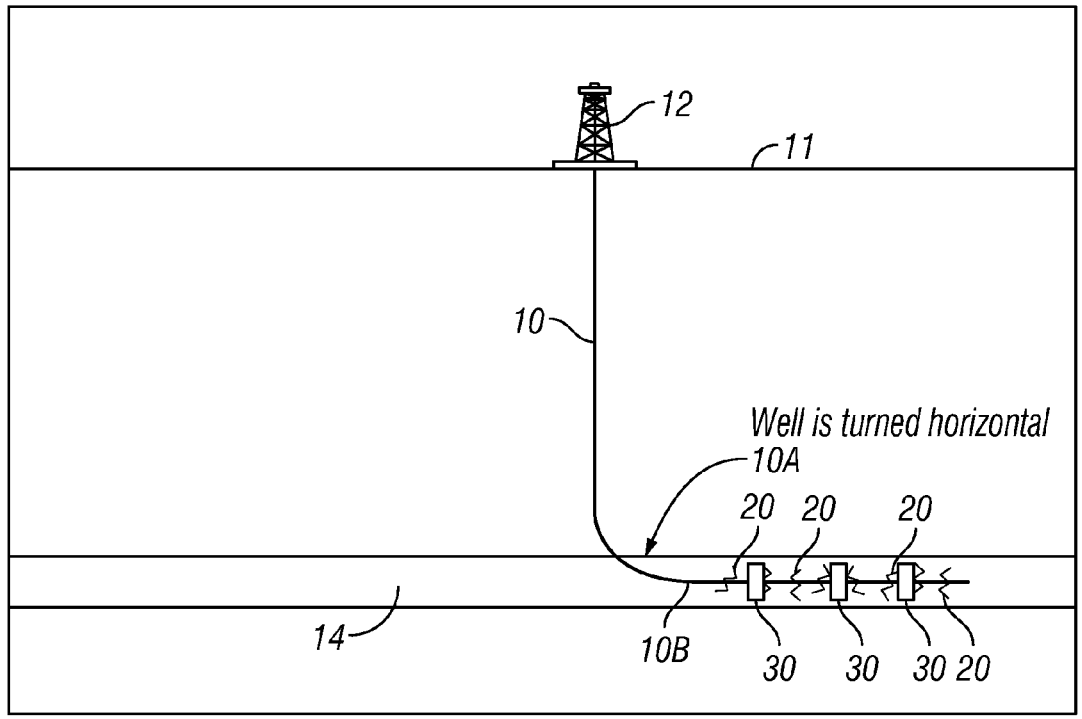
FIG. 1 is a cross section of a horizontal well after hydraulic fracturing.

FIG. 1 is a cross section of an example wellbore 10 drilled through subsurface formations by a drilling rig 12 or similar device well known in the art disposed at the Earth's surface 11. Although the example rig 12 shown is used on the land surface, the disclosed examples are equally applicable to marine drilling. The wellbore 10 may be initially drilled vertically or near vertically, and when approaching a target formation 14, directional drilling equipment (not shown) may be used to change the trajectory of the wellbore at 10A so that it ultimately follows the trajectory at 10B of the target formation 14.

The target formation 14 may be hydraulically fractured 20. Portions of the wellbore at 10B may be hydraulically isolated from each other using plugs 30 or similar mechanical seal devices to enable subsequent selective treatment, e.g., hydraulic fracturing of individual portions of the wellbore at 10B.

Figure 2:
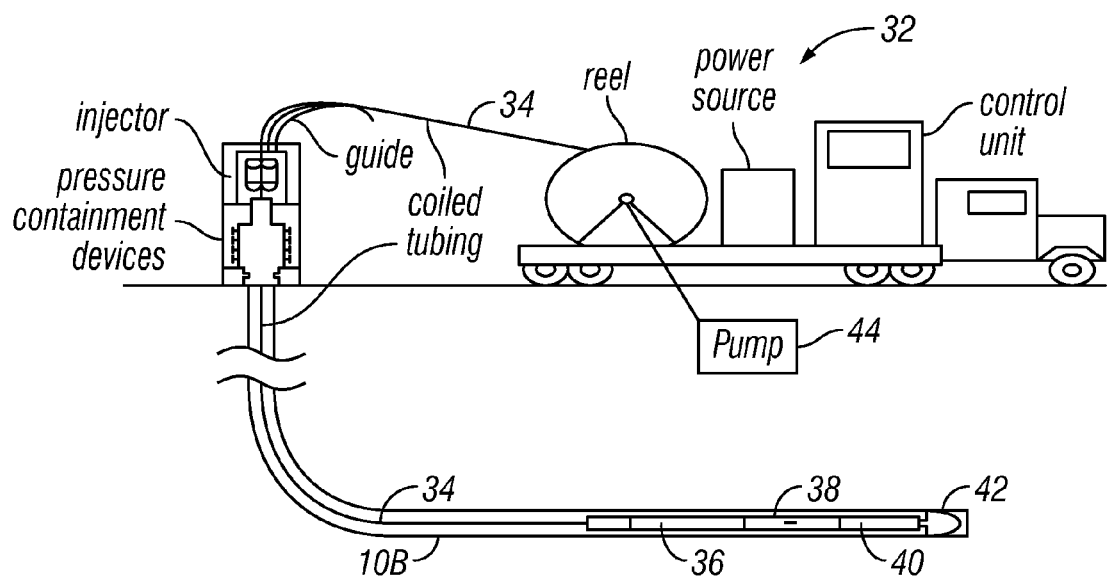
FIG. 2 shows cleaning out the wellbore of FIG. 1 using a coiled tubing system.

After each such selective treatment, it may be required to clean out the excess fracturing proppant (e.g., sand) and to remove one or more of the plugs 30. Referring to FIG. 2, one example of such removal and cleaning operation may use a conduit contained on a coiled tubing unit 32 of types well known in the art to insert and withdraw a coiled tubing 32 from the wellbore 10B. A distal end of the coiled tubing 34 may include an orienting device 36, sensors 38 of various types known in the art, an hydraulic motor 40 such as a positive displacement motor or a turbine motor operated by flow of fluid through the coiled tubing 34 and a bit or mill 42 at the distal end. Additional tools may be included in the bottom-hole assembly to facilitate the clean out including but not limited to agitators, reverse jet annular velocity enhancers, and mechanical tractors. During cleanout operations, fluid is pumped into the coiled tubing 34 such as by using a fluid pump 44, the motor 40 causes the bit or mill 42 to rotate, and cuttings and excess fracture proppant are lifted to the surface as the fluid exits the bit 42 and flows up an annular space between the coiled tubing 34 and the wall of the wellbore 10B. The example shown in FIG. 2 is not meant to limit the types of conduit or conveyance apparatus that may be used in cleaning out a wellbore. Other types of conduit may include jointed tubing and drill pipe, and drilling rigs as in FIG. 1 or workover rigs may be used in such cleanout operations with equal effect.

In one example, the fluid may include an effective amount of an amphiphilic chemical blended with an effective amount of a friction reducer in an aqueous solution. The amphiphilic chemical may be a single compound or a mixture of compounds. Two non-limiting examples of the amphiphilic chemical may include 2-butoxyethanol at a concentration of 2.4 to 24 parts per million in the aqueous solution combined with acetic acid at concentrations of 6 to 24 parts per million in the aqueous solution. Another example of the amphiphilic chemical may be polydimethylsiloxane copolymer at a concentration of about 100 to 300 parts per million in the aqueous solution. An example of a friction reducer may include polyacrylamide, or an AMPS acrylamide polymer at a concentration of 70 to 150 parts per million in the aqueous solution. In the present context "aqueous" solution may be used to mean water or completion brine as the base liquid, or any other base liquid that is essentially non-reactive with the amphphilic chemical and the friction reducer. "Effective amount" with reference to the amphiphilic chemical and the friction reducer may mean an amount which optimizes the pressure pumping, flow rates, and removal of sand, debris and other particulate contaminants from the wellbore as a result of fluid flow out of the wellbore in the annular space between a conduit and the wall of the wellbore (explained below with reference to FIG. 2).

In use, the foregoing solutions may be used substantially as explained with reference to FIG. 2. Testing has shown that substantially more fracture proppant and debris may be removed from a wellbore than using gel pills and larger amounts of friction reducer as known in the art.

While the invention has been described with respect to a limited number of embodiments, those skilled in the art, having benefit of this disclosure, will appreciate that other embodiments can be devised which do not depart from the scope of the invention as disclosed herein including but not limited to multi-stage vertical well completions and the clean out of pipeline systems where solids accumulations occur. Accordingly, the scope of the invention should be limited only by the attached claims.

What is claimed is:

1. A fluid composition for the cleanout of debris from wellbores or pipe systems, comprising:
   an effective amount of an amphiphilic chemical combined with an effective amount of a friction reducer in an aqueous solution of a base liquid wherein the amphiphilic chemical comprises 2-butoxyethanol in a range of 2.4 to 24 parts per million combined with acetic acid in a range of 6 to 24 parts per million; and
   a remainder of the composition comprising the base liquid.

2. The composition of claim 1 wherein the friction reducer comprises polyacrylamide polymer or derivatives thereof.

3. The composition of claim 1 wherein the base liquid comprises water or completion brine.

4. A method for cleaning out a wellbore, comprising:
   pumping a fluid composition through a conduit inserted into the wellbore, the fluid composition comprising an effective amount of an amphiphilic chemical combined with an effective amount of a friction reducer in an aqueous solution of a base liquid, and a remainder of the composition comprising the base liquid wherein the amphiphilic chemical comprises 2-butoxyethanol in a range of 2.4 to 24 parts per million combined with acetic acid in a range of 6 to 24 parts per million;
   receiving the fluid composition with debris entrained therein at the surface from an annular space between the conduit and a wall of the wellbore.

5. The method of claim 4 wherein the conduit comprises coiled tubing.

6. The method of claim 4 further comprising drilling at least one sealing element in the wellbore during insertion of the conduit.

7. The method of claim 4 wherein the friction reducer comprises polyacrylamide or AMPS acrylamide polymers.

8. The method of claim 1,7 wherein the effective amount of the polyacrylamide or AMPS acrylamide polymers is in a range of 100 to 300 parts per million.

9. The method of claim 4 wherein the base liquid comprises water or completion brine.

* * * * *